(12) United States Patent  
Graff (10) Patent No.: US 9,081,740 B2  
(45) Date of Patent: Jul. 14, 2015

(54) SIGNAL PROCESSING SYSTEM AND METHOD FOR PROCESSING SIGNALS IN A BUS NODE

(75) Inventor: Uwe Graff, Ostfildern (DE)

(73) Assignee: FESTO AG & CO. KG, Esslingen (DE)

( * ) Notice: Subject to any disclaimer, the term of this patent is extended or adjusted under 35 U.S.C. 154(b) by 0 days.

(21) Appl. No.: 14/119,094

(22) PCT Filed: Jul. 6, 2012

(86) PCT No.: PCT/EP2012/002853
§ 371 (c)(1),
(2), (4) Date: Mar. 21, 2014

(87) PCT Pub. No.: WO2013/004395
PCT Pub. Date: Jan. 10, 2013

(65) Prior Publication Data
US 2014/0207982 A1  Jul. 24, 2014

(30) Foreign Application Priority Data

Jul. 6, 2011 (DE) .......................... 10 2011 106 687

(51) Int. Cl.
G06F 13/12  (2006.01)
G06F 13/38  (2006.01)
G06F 13/16  (2006.01)

(52) U.S. Cl.
CPC .................................. *G06F 13/1652* (2013.01)

(58) Field of Classification Search
None
See application file for complete search history.

(56) References Cited

U.S. PATENT DOCUMENTS

| | | | |
|---|---|---|---|
| 7,542,867 B2 * | 6/2009 | Steger et al. | 702/127 |
| 2002/0111753 A1 * | 8/2002 | Moch | 702/57 |
| 2002/0194547 A1 | 12/2002 | Christensen et al. | |
| 2003/0074388 A1 | 4/2003 | Pham et al. | |
| 2004/0208163 A1 | 10/2004 | Patel et al. | |
| 2006/0058847 A1 | 3/2006 | Lenz et al. | |
| 2006/0136626 A1 * | 6/2006 | Avritch et al. | 710/69 |
| 2009/0217264 A1 * | 8/2009 | Heller et al. | 718/1 |
| 2010/0115501 A1 * | 5/2010 | Partridge et al. | 717/148 |
| 2013/0219219 A1 * | 8/2013 | Schroeder et al. | 714/32 |

FOREIGN PATENT DOCUMENTS

| | | |
|---|---|---|
| DE | 4332895 | 5/1995 |
| DE | 10358231 | 7/2005 |
| EP | 1728131 | 12/2006 |
| WO | WO 2005/096660 | 10/2005 |

* cited by examiner

*Primary Examiner* — Elias Mamo
(74) *Attorney, Agent, or Firm* — Hoffmann & Baron, LLP (57) ABSTRACT

A signal processing system having a bus node, which is designed for signal conversion between signals of an internal and an external bus system and in each case includes at least one interface to be coupled to the external bus system and to the internal bus system, and having at least one signal conditioning module, which is designed for physical conditioning and/or analog/digital conversion for signals from an external component and includes an interface for an internal bus system and at least one connection for the external component and is connected to the bus note via the internal bus system. The bus node is designed for internal raw data processing of the signals provided by the signal conditioning module and to output at least one output signal dependent on the processed signals to the internal and/or to the external bus system.

11 Claims, 3 Drawing Sheets

SIGNAL PROCESSING SYSTEM AND METHOD FOR PROCESSING SIGNALS IN A BUS NODE

This application claims priority based on an International Application filed under the Patent Cooperation Treaty, PCT/EP2012/002853, filed Jul. 6, 2012, which claims priority to German Patent Application No. DE102011106687.3, filed on Jul. 6, 2011.

BACKGROUND OF THE INVENTION

The invention relates to a signal processing system with a bus node, which is designed for signal conversion between signals of an internal and an external bus system, and in each case includes at least one interface for coupling to the external bus system and the internal bus system, and with at least one signal conditioning module which is designed for physical conditioning and/or analog-to-digital conversion of signals of an external component and has an interface for the internal bus system and at least one connection for the external component, and is connected to the bus node via the internal bus system. The invention also relates to a method for processing signals in a bus node.

Known from DE 4332895 C1 is a method for fault detection in programmable logic controllers which are built up hierarchically in modular fashion from various electrical components, wherein each component is a physical unit and at least one highest-ranking, higher-level component as designed as control station. Here, the following steps are provided for the procedure: after each installation of at least one component, the module-specific parameters of the respective component are read from a non-volatile memory and checked for compatibility with implemented software modules. Higher-level components are also checked for compatibility with the module-specific parameters of each subordinate component. Any incompatibility found is indicated and subordinate components report the current configuration and each identified incompatibility to the respective higher-level component.

EP 1728131 A2 discloses an electrical field device with a computer-controlled central control module and at least one input/output module with data inputs and/or outputs, wherein the central control module and the input/output module or modules is or are connected via a data bus, and the module parameters giving the type and number of the data inputs and/or outputs of at least one input/output module are made available for retrieval by the central control module. Therefore, the information on the type and number of their data inputs and/or outputs is now already made available by the input/output module or modules.

US 2006/058847 discloses a distributed operating system with integral diagnostic function, a bit bus and a field bus, and includes a field device for generating a field operation characteristic together with a field processing module for processing the field operation characteristic of the field device. The field processing module contains a field diagnostic component and a field communication component, which is designed for communication via the bit bus. The field processing module is designed for the generation of field operating data, including a field diagnostic parameter as a function of the field operating characteristic. An additional processing module is designed for communication with the bit bus and to receive the field operating characteristic. The additional processing module contains an additional diagnostic component and an auxiliary communication component, which includes a field bus interface and a gateway component. The additional processing module is also designed for the generation of additional field data as a function of the field operation data and for transmission of the additional field data via the field bus.

DE 10358231 discloses a device with at least one field connection module for the connection of at least one field device via a first field bus to a higher-level system for data transmission between the first field connection module or modules and the higher-level system, in which the first field connection module or modules has or have a first bus interface connection for connection to the higher-level system via the first field bus and in which the first field connection module or modules has or have a second bus interface connection for connection to a second bus.

US 2002/194547 discloses a method for wiring fault detection, diagnosis and reporting, to test connection devices in a process control system and in particular to determine the electrical properties of a segment protocol bus and the electrical properties of the signals of the protocol transmitted by the bus. In this connection, a signal line of a segment protocol bus is connected to one measuring block out of a multiplicity of measuring blocks within a wiring fault detection unit. The measuring block from the multiplicity of measuring blocks measures an electrical property linked to the segment protocol bus and sends the measured electrical property on a wiring cable to a wiring fault diagnostic manager. The wiring fault diagnostic manager analyses the measured electrical properties to determine the type of wiring fault, and reports the fault type of the wiring fault via a user interface.

The known signal processing systems always include a field device, also described as bus node, which is designed for signal conversion between signals of an internal and an external bus system, together with mostly several modules electrically coupled to the bus node. The modules may be for example input/output modules and/or function modules, in particular a valve module. The electrical coupling between the bus node and the modules may include both electrical power supply to the modules and also an internal bus system designed for bi-directional communication between the modules and the bus node. At the same time, the internal bus system serves on the one hand for the transmission of control signals, which are extracted at the bus node from signals of an external bus system, for example a field bus system, and are converted in the bus protocol of the internal bus system, from the bus node to the modules. On the other hand, the internal bus system is also used for the transmission of signals, for example sensor signals from sensors, which are provided as output signals by the input/output modules, to the bus node. The designation "internal bus system" is also intended to cover bi-directional communication systems, for example in accordance with the I/O link standard, or parallel-wired multi-wire systems, which are also described as multipole systems.

SUMMARY OF THE INVENTION

The problem of the invention is to specify a signal processing system and a method of processing signals in a bus node which facilitate improved signal processing.

This problem is solved according to a first aspect of the invention by a signal processing system of the type described above, in which the bus node is designed for internal raw data processing of signals provided by the signal conditioning module, and for output of at least one output signal dependent on the processed signals to the internal and/or the external bus system.

In contrast to the known field devices which undertake adaptation of the incoming signals of the external components, already processed by the signal conditioning module, to the bus protocol of the external bus system, according to the invention processing of the raw data of the external components takes place in the bus node. The raw data are preferably conditioned by the respective signal conditioning module only to the extent that they can be transmitted over the fast internal bus system at least virtually free from interference and loss. The signal conditioning module therefore has the primary task, or where applicable the sole task, of conditioning the incoming signals from the external components for communication over the internal bus system, while processing of the content represented by the signals takes place only in the bus node. The transfer of raw data processing from the signal conditioning modules to the bus node leads to a considerable simplification of the signal conditioning modules, since the hardware capacity for the implementation of processing tasks in the signal conditioning modules may be considerable reduced. It is also possible to dispense, where applicable, with the need for different software configuration of the signal conditioning modules concerned, if they are intended for use to connect different external components, since the main or sole task of the signal conditioning modules lies in conditioning the incoming signals from the external components for transmission over the internal bus system.

By way of example provision may be made, using the signals of the external components, to generate an output signal which may be used, preferably directly, as control signal for another external component. Whereas previously it was necessary to pass on signals from the external components via the bus node and the external bus system to a machine control, with further processing taking place at that point, together with the return of a control command via the external bus system, it may now be provided for the output signal to be made available directly by the bus node after suitable processing of the relevant raw data.

For example the output signal may be used as parameterising signal for a parameterisabie sensor and/or as drive signal for an electrically drivable actuator connected to a signal conditioning module, in particular an electrical drive, and/or as drive signal for a function module connected to the bus node via the internal bus system, for example an electrically drivable valve module. By means of the signal processing in the bus node and the generation of a preferably directly usable output signal which may be used in the exemplary manner as input signal for different components connected to the internal bus system, it is possible to achieve in particular a reduction in the volume of data to be transmitted over the external bus system. This is due to the fact that certain signals do not need to be transmitted at all, and other only in selected cases, over the external bus system, in order to generate suitable control commands in the machine control, which are made available to the bus node via the external bus system. For example, transmission of signals of an external component via the external bus system may be avoided if all conditions required for generation of a suitable output signal exist in the bus node. Since in many cases it is possible to dispense with transmission of signals of the external components via the bus node and the external bus system, shorter signal propagation paths for the signals of the external components and the output signals generated from these in the bus node are provided, resulting in improved ability of the signal processing system to react.

Advantageous develops developments of the invention are described in the dependent claims.

It is advantageous if the bus node includes an at least partly freely programmable and/or freely allocable memory device for the storage of an algorithm, and a processing device for processing the signals provided by the signal conditioning module and for the output of an output signal by means of the stored algorithm. The memory device is designed for the storage of at least one algorithm, preferably several algorithms, which may be stored either permanently or deletably in the memory device during the production process, or may be loaded into the bus node at any time given suitable software configuration of the bus node. The algorithm may be static, so that a user has no option of influencing the way in which the algorithm functions. Preferably the algorithm is parameterizable, so that a user may influence the behaviour of the algorithm through the input of parameter values. The processing device is used to determine the output signal with the aid of the algorithm selected from the memory device and where applicable with parameters set by the individual user. Preferably the memory device and the processing device may be realised in a common semiconductor chip.

In a further variant of the invention it is provided that the processing device, in particular in the form of a microprocessor or microcontroller, contains several instruction levels for the processing of different instructions, wherein a first instruction level is set up for direct communication with the processing device, and further instruction levels for preferably exclusive communication with in each case adjacent, in particular exclusively adjacent, instruction levels. The individual application levels are provided to ensure ease of handling of the processing device. The first processing level is typically defined and made available by the manufacturer of the microprocessor or microcontroller since, on this processing level there is direct access to the processing device, for example through storage or readout of data content in or from memory cells, and for this purpose precise knowledge of the physical structure of the processing device is required. Via this first instruction level it is possible to provide one or more further instruction levels. While in the first application level an application command set is used which is tailored to the requirements of the processing device, in the higher application levels it is also possible to use in each case different application command sets which, with increasing distance from the processing device, are tailored more to the end user of the signal processing system. Preferably, a graphical user interface is also formed in at least one of the application levels, to facilitate especially easy configuration of the signal processing system.

It is advantageous if the processing device is set up in one instruction level, located above the first instruction level, for the operation of one more more instruction modules, preferably presettable by the end user, and if the algorithm provided for processing the signals supplied from the signal conditioning module and to output an output signal is in the form of an instruction module. The application modules are preferably easily interchangeable computer program modules which may be selected by the end user for example from a database over the internet, and stored in the processing device via a suitable wire-bound or wireless interface. The application module or modules are set up to process the signals arriving from one or more signal conditioning modules and in this connection to make use of the computing power of the bus node. The application modules may be so designed that they are parameterised either in the processing device or before storing in the processing device, in order to facilitate advantageous adaptation to the properties of the processing device and/or to the properties of the connected signal conditioning modules.

Preferably the processing device is set up, in an instruction level which is located above the first instruction level, for data interchange, in particular secured, with at least one instruction module by means of a standardised instruction command set. At the same time, for example signals arriving from a signal conditioning module and which are not necessarily pre-processed on the same instruction level as the instruction module, are provided at the instruction level of the instruction module. In the corresponding instruction level, the signals are passed on to the instruction module, with the aid of a standardised instruction command set which is provided for communication from the instruction level. Here the commands of the standardised instruction command set are preferably chosen so that they may be executed only directly on the instruction level, but not on adjacent instruction levels. This prevents undesired interventions into the adjacent instruction levels and ensures high operating reliability for the processing device, also interchangeability of the instruction module. This also makes possible the use of the relevant instruction module in variously configured processing devices, so long as these have an instruction level set up for such instruction modules It is expedient if the processing device includes in one instruction level, which is located above the first instruction level, a virtual machine, in particular a runtime environment, which is designed to operate the instruction module in a standardised, in particular secure, instruction module environment. The virtual machine is a computer program which runs in the instruction level in which the instruction module to be executed and is used to execute the instruction module which is for example in the form of an intermediate code or byte code. This involves the virtual machine interpreting or translating the byte code for an underlying instruction level, in which for example the signals arrive from the signal conditioning modules and/or an output signal is passed on over the internal or external bus system. A runtime environment includes in particular a simple command structure and where applicable options for fault rectification and optimisation of a command chain. Some functions of the runtime environment may be set or parameterised by the end user, while other functions such as for example resource administration of the processing device are on the other hand not accessible. The runtime environment may be adapted to an operating system of the processing device lying in an instruction level which is lower in the hierarchy and represents a platform for the instruction modules which is independent of this operating system. Consequently the instruction modules may be used on a multiplicity of different operating systems, with no need to modify the instruction modules for this purpose.

In a development of the invention it is provided that the virtual machine is set up for simultaneous administration of several instruction modules and/or that several virtual machines are provided for the processing of different instruction modules. By this means either several instruction modules which work with the same standardised instruction command set may be operated in parallel or sequentially. In addition or alternatively it is possible to provide, on one single or in different instruction levels, for different virtual machines, in particular runtime environments, which are able to process instruction modules with different standardised instruction command sets.

Preferably the bus node is so designed for provision of the output signal to the external bus system that the output signal may be passed to the external bus system in the same way as signals from signal conditioning modules. In the case of a bus node as known from the prior art, one of its main tasks is to transfer the signals of external components, as provided by the signal conditioning modules via the internal bus system, into the bus protocol of the external bus system and therefore to the machine control, which may for example be in the form of a programmable logic control. The machine control recognises in the bus protocol the signals of the external components and is able to further process these signals, in contrast, in the bus node according to the invention, provision is made for processing of signals of external components leading to output signals, for example through observation of the signals over a longer period of time and/or combination of several signals. These output signals are provided by the bus node according to the invention to the external bus system in such a way that they represent for the machine control the signals of a further signal conditioning module connected to the bus node. Since however consolidated and/or combined signals of other signal conditioning modules are involved, the output signals may also be regarded as signals of virtual signal conditioning modules.

It is advantageous if the memory device is designed for the storage and processing of an instruction module which contains the algorithm. The program module may be loaded with this as a ready programmed application for processing the raw data in the memory device, and used in the bus node for processing the raw data. Preferably various instruction modules are available, containing different algorithms and therefore designed for different processing tasks. The instruction modules may by way of example be provided from a module library, for example via remote data transmission, in particular over the internet, and written into the bus node according to the desired application.

For this purpose it is advantageous if the memory device is designed for write access or read-write access to the instruction module or modules by means of the external bus system and/or an input interface formed on the bus node, in order to facilitate modification and/or parameter setting and/or replacement of the instruction module.

In a further development of the invention it is provided that the instruction module is designed for monitoring energy flows and/or volume flows and/or servicing intervals and/or safety functions of the external components connected thereto. For example the program module may be used, with the aid of the raw data provided, for the determination of an energy flow, i.e. for example an electrical amperage or a supplied electrical output. Here the external component has the task of converting one or more physical characteristic values into electrical signals. The physical conditioning and/or analog-to-digital conversion of the signals takes place in the signal conditioning module, while the information content of the signals is analysed only in the bus node and converted into a new output signal.

Preferably the signal conditioning module is designed exclusively for physical conditioning and/or analog-to-digital conversion of signals of one external component. This means that the signal conditioning module may be simple in structure and capable of use for the connection of quite different external components to the internal bus system, without the need for modification of the signal conditioning module. In the case of formerly known signal conditioning modules, on account of the low bandwidth/data transmission rate of the internal bus systems commonly used to date, it was always necessary to process the raw data of the external components directly in the signal conditioning module. Accordingly, individual adaptation of the signal conditioning module to different external components was required, which had to be effected on the hardware and/or software side, resulting in the need to provide a multiplicity of different signal conditioning modules, in order to perform the different processing tasks. Through the transfer of the raw data processing into the bus node, which is now possible due to the increased bandwidth/data transmission rate of the internal bus systems now available, individual modification of the signal conditioning modules is unnecessary. Instead, the different processing tasks are taken care of by the instruction module or modules running in the processing device of the bus node. This makes possible a considerable reduction in the number of different signal conditioning modules.

It is expedient for the instruction module stored in the processing device of the bus node to be in the form of a meter, wherein the output of an output signal by the bus node may be provided for example as soon as the meter has detected a presettable number of meter pulses. Since the counting of the pulses does not take place directly in the signal conditioning module, the electrical wiring of the latter may be kept simple. In combination with the bus node according to the invention, the signal conditioning module always ensures only the physical conditioning of the signals and where applicable an analog-to-digital conversion of the signals.

In an advantageous development of the invention it is provided that the instruction module is designed for logical linking of several signals of different external components and/or for linking of output signals. This makes possible an especially rapid local processing of signals of external components and/or several output signals, provided as applicable by different signal conditioning modules. By way of example, several sensors may be connected to a signal conditioning module, and their signals linked logically together in the instruction module, in order for example to generate one or more output signals in the presence of at least one presettable combination of signal levels of the different signals.

Preferably the bus node is designed for the provision of an output signal which is set up for the driving of at least one external component and/or function module connected to a signal conditioning module.

Here the bus node us used directly, i.e. without using the external bus system and the machine control, as driver for external components and/or function modules, so that for these operations no capacity of the external bus system and the machine control is required. This results in an especially short reaction time for the drive processes depending on the incoming signals from the sensors and/or the function modules, with a simultaneously simplified electrical and/or electronic design of the signal conditioning module.

It is advantageous if the instruction module is designed for status monitoring, in particular for process monitoring and/or machine monitoring, with the aid of signals of at least one component, and is so set up that the output signal, in a presettable fault situation, is provided as alarm signal to the external bus system and/or as switch-off signal via the internal bus system to the external component and/or to a function module. In the implementation of status monitoring it is of great importance that a change in the monitored state leads to a reaction in the shortest possible time. This may be ensured by the signal processing system according to the invention in an advantageous manner since, on account of the local signal processing in the bus node, at most very short delay times occur due to signal transmission over the internal bus system and processing of the signals in the bus node, while longer delay times due to signal conversion in the bus node and signal transmission via the external bus system as far as the machine control, do not occur. Preferably the bus node is so configured that an alarm signal and/or a switch-off signal for connected external components and/or function modules is provided by the bus node as soon as a monitored signal exceeds a presettable limit value in a presettable manner, in particular in respect of a rate of change and/or duration of the overshoot.

It is expedient if the bus node is designed for parameterising of the instruction module via the external bus system and/or via direct access to the bus node. Parameterising of the instruction module in the bus node may be undertaken apart from operation, for example through suitable presetting on the part of the machine control, which addresses the bus node via the external bus system. In the case of direct access, for example using a portable computer, the bus node and the instruction module it contains are accessed directly without using the external/internal bus system.

The problem of the invention according to a second aspect is solved by a method for the processing of signals in a signal conditioning system which is designed for detection and processing of signals of at least one external component, passing on of the signals via an internal bus system to a bus node, and processing of the signals in the bus node, wherein the following steps are provided: receiving of signals from an external component, conditioning and or digitalisation of the signals in a signal conditioning module, transmission of the signals via the internal bus system to the bus node, processing of the signals by means of an algorithm filed in the bus node, output of an output signal generated through the processing to an external component and/or a function module.

It is expedient if the signals arriving at the bus node as raw data are processed in a processing device included in the bus node and in which several instruction levels are designed for the processing of several instructions, wherein a first instruction level is set up for direct communication with the processing device and further instruction levels for communication with respectively adjacent instruction levels, in a further instruction level located above the first instruction level by the algorithm in the form of an instruction module, in a virtual machine, in particular in a runtime environment.

In an advantageous development of the method it is provided that write access or read-write access to the memory device is made by means of the external bus system and/or an input interface formed at the bus node, in order to accomplish a change and/or parameter setting and/or replacement of the instruction module.

It is advantageous if the instruction module is designed for monitoring energy flows and/or volume flows and/or servicing intervals and/or safety functions of the external components connected thereto In a variant of the method it is provided that, in the signal conditioning module, only physical conditioning and/or analog-to-digital conversion of signals of an external component is or are carried out.

In a further variant of the method it is provided that the instruction module is used for status monitoring of a device, wherein the device is assigned at least one external component connected to the signal conditioning module and therefore the bus node, in at least one presettable fault situation, is able to provide an alarm signal and/or a shutdown signal as output signal to a connected external component and/or to a function module and/or to the external bus system.

An advantageous development of the method provides for the instruction module to perform a logical, in particular Boolean, linking of signals of different external components and/or that the output signal is used to drive at least one function module and/or at least one external component.

BRIEF DESCRIPTION OF THE DRAWINGS

An advantageous embodiment of the invention is depicted in the drawing, showing in.

DETAILED DESCRIPTION OF THE PREFERRED EMBODIMENTS

Figure 1:
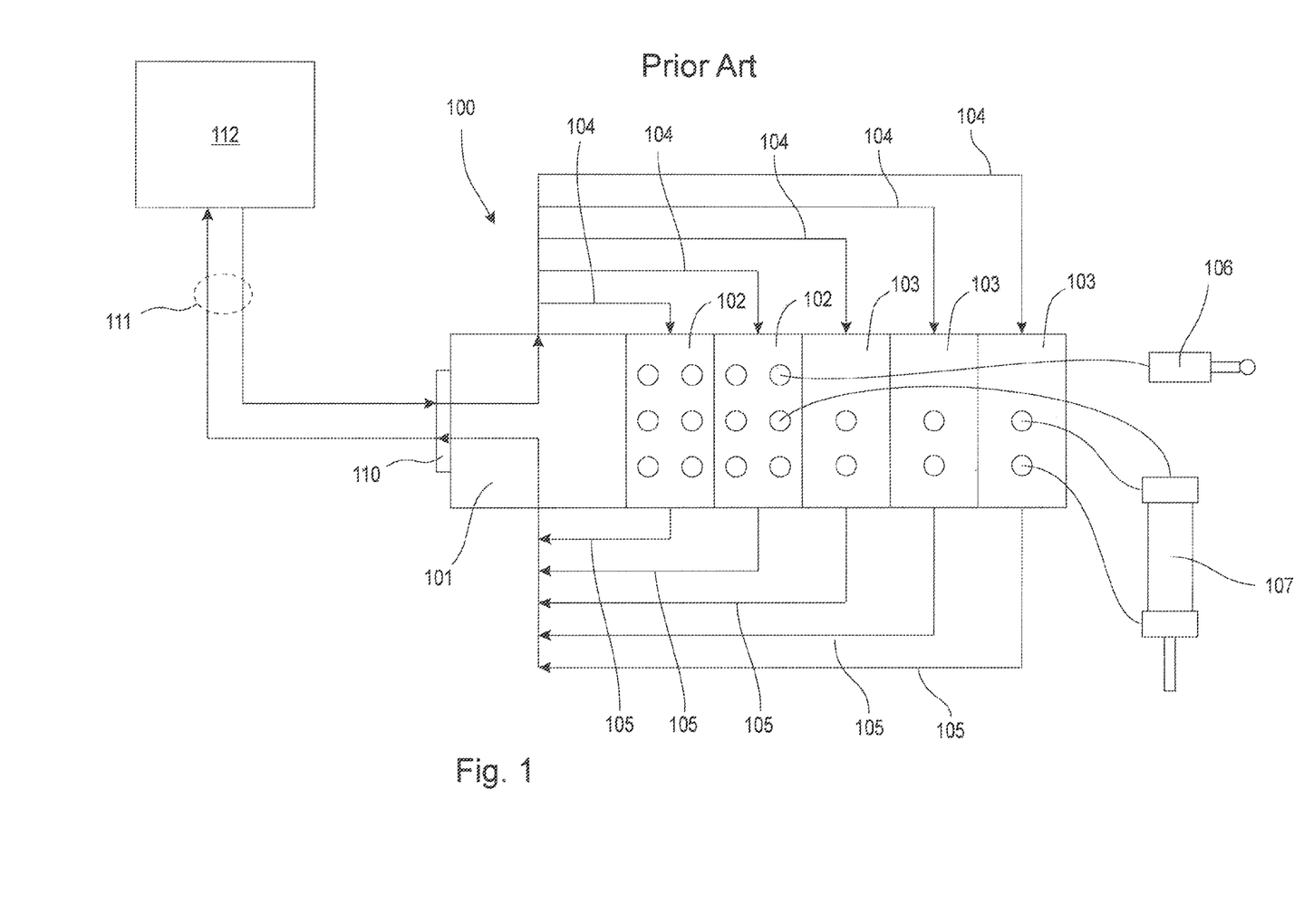
FIG. 1 a signal processing system according to the prior art

A signal processing system 100 known from the prior art comprises a bus node 101, several input/output modules 102 and several function modules 103. The input/output modules 102 and the function modules 103 are by way of example lined up along an axis of lining-up at the bus node 101. In this connection it may be provided for electrical and/or fluidic connections between adjacent input/output modules 102 and function modules 103 to be formed by electrical lines and/or fluid passages, not shown in detail, which extend along the axis of lining-up. In an embodiment of the invention which is not shown, the modules are either not at all or only partly physically connected to one another.

The input/output modules 102 are for example provided for the connection of external components such as discrete sensors 106 or sensors integrated in fluidic or electrical actuators 107 and designed for the provision and processing of electrical signals. The function modules 103 may be for example in the form of valve modules which are set up for the purpose of influencing a fluid flow, for example to block, completely open or to restrict, in order for example in this way to drive a fluidic or electrical actuator 107 which in turn has a position measuring device, not shown in detail, which is connected electrically to an input/output module 102. The bus node 101 has an external interface 110 which is designed for electrical connection to a higher-level bus system 111, over which for example control commands of a machine control 112 may be supplied to the signal processing system 100, and/or sensor signals emanating from the signal processing system 100 may be transmitted over the external bus system 111 to the machine control 112 for further processing.

In the bus node 101, signal conversion between the signals of the external bus system 111 and signals of an internal bus system takes place, so that control commands of the machine control 112, which are made available via the external bus system, are converted into the protocol of the internal bus system and may be transmitted over the internal bus system to the input/output modules 102 and the function modules 103. The external bus system 111 is by way of example a field bus system, in particular conforming to the Profibus, Industrial Ethernet or LVDS specification (low voltage differential signal).

The signal transmission over the internal bus system is indicated schematically by the arrows for the control signals 104 in the Figure. From the input/output modules 102 and the function modules 103, each representing signal conditioning modules, signals may be provided which for example are in a relationship with the connected sensors 106 or actuators 107, which for their part are described as external components, or with functional states of the function modules 103. These signals are returned to the 101 over the internal bus system according to the arrows for sensor signals 105. This structure of the internal bus system requires in the input/output modules 102 and the function modules 103 only physical conditioning, for example amplification of the signals of the sensors 106, actuators 107 or function modules 103, and/or digitalisation of the signals obtained, so that they may be transmitted over the internal bus system to the bus node 101.

The signals of the external components 106, 107 arriving in the bus node 101 are converted from the protocol of the internal bus system into the protocol of the external bus system 111 and then passed on via the external bus system 111 to the machine control 112. In the machine control 112, a processing of the signals then takes place, so as to generate from this the output or control signals which are fed back via the external bus system 111 to the bus node 101. There, a conversion of the output or control signals from the protocol of the external bus system 111 into the protocol of the internal bus system takes place, so that the output or control signals of the machine control 112 may be transmitted to the input/output modules 102 and/or the function modules 103 and the external components 106, 107 connected to them. The multiple conversion of the signals or output signals and the transmission of the signals or output signals both over the internal bus system and also over the external bus system 111 results in relative long propagation times between the detection of a state of an external component 106, 107 and the provision of a corresponding output or control signal to an external component 106, 107.

In addition or alternatively it may be provided that the signals of the external components 106, 107 are processed directly in the input/output modules 102. The output signals determined in this case may either be transmitted over the internal bus system, the bus node 101 and the external bus system 111 to the machine control 112, or used directly in the relevant input/output module 102 to drive the connected external components 106, 107. However, this requires specific hardware equipment in the relevant input/output module 102, which means that the production costs for such an input/output module 102 are higher than for an input/output module 102 designed only for physical conditioning and/or digitalisation of the signals determined.

Figure 2:
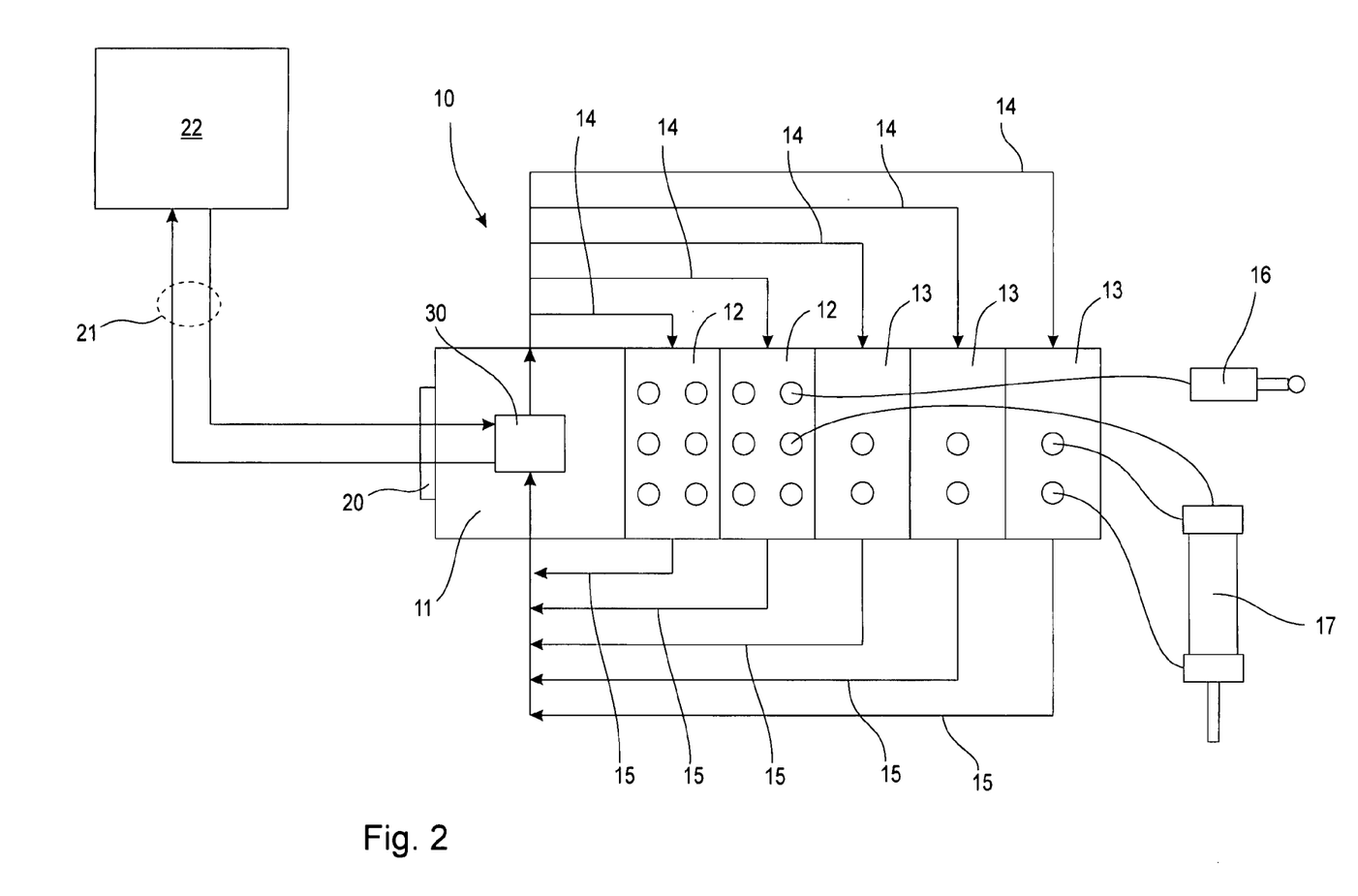
FIG. 2 an embodiment of a signal processing system according to the invention, and FIG. 3 a schematic view of a processing device of the signal processing system shown in FIGS. 1 and 2.

In the embodiment of a signal processing system 10 according to the invention shown in FIG. 2, the physical design is basically the same as for the signal processing system 100. Accordingly, several input/output modules 12 and function modules 13 are lined up alongside one another along an axis of lining-up at a bus node 11, and are in electrical and where applicable fluidic connection with one another via electrical connections and where applicable also fluid passages, not shown in detail. Sensors 16 and/or for example position measuring systems of actuators 17, for example fluidic or electrical, may be connected at the input/output modules 12 and supply sensor signals to the input/output modules 12.

Corresponding with the prior art described above, the signals provided by the sensors 16 and/or the actuators 17 or by the function modules 13 are transmitted over the internal bus system to the bus node 11. Differing from the prior art described above, no signal processing takes place in the input/output modules 12, but instead the incoming signals are only amplified and/or digitalised in order to ensure low-interference transmission over the internal bus system to the bus node 11. This transmission of raw data over the internal bus system is facilitated by the speed of the internal bus system, which ensures real-time transmission of the raw data.

Stored in the bus node 11, in a processing device 30 which is in particular a microprocessor or a microcontroller, is at least one algorithm with the aid of which the signals are processed, i.e. for example a comparison of signals received with stored value tables is made, from which output signals are derived and/or several signals are logically linked to generate an output signal. The processing of signals is effected by way of example on several different instruction levels, as explained in detail below with the aid of FIG. 3.

Figure 3:
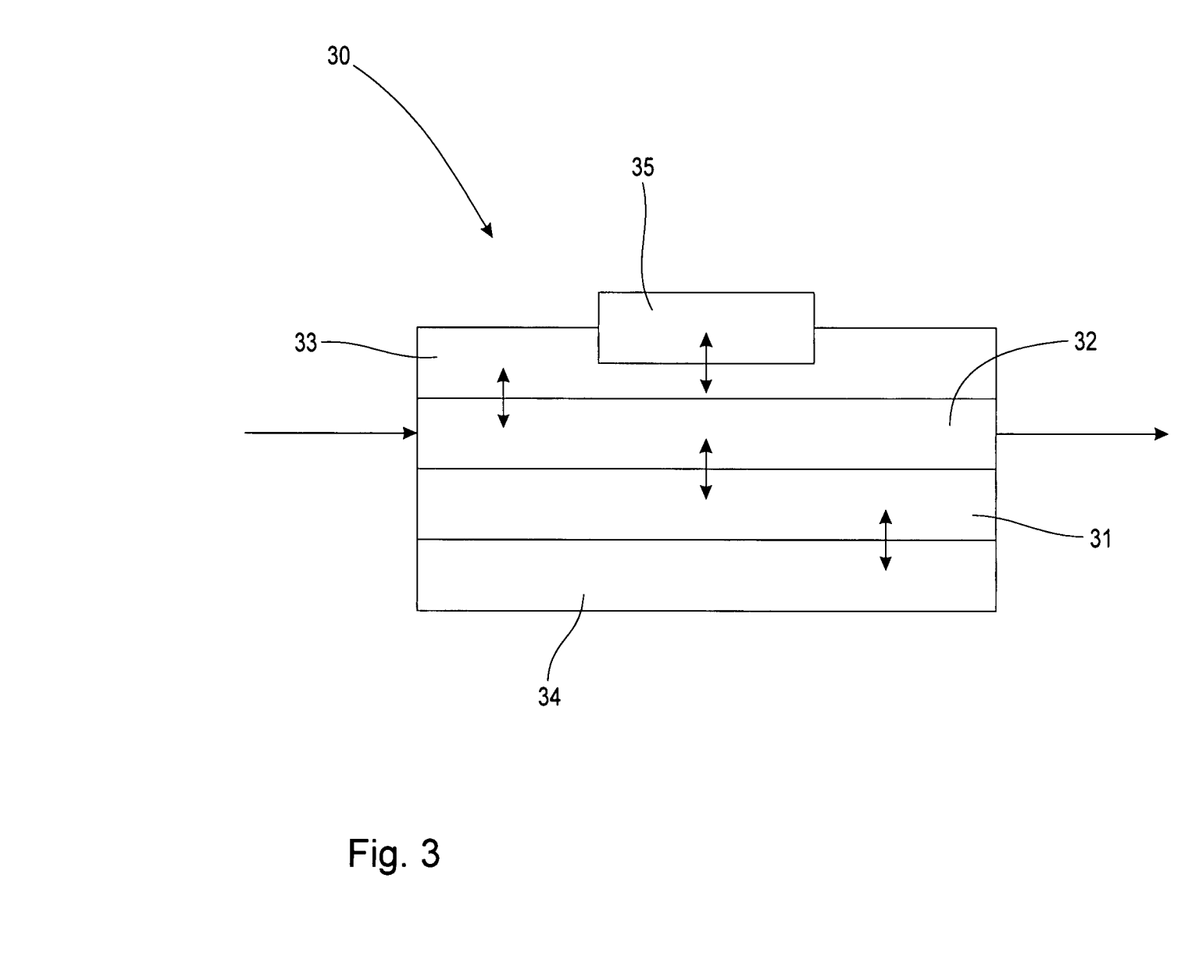

FIG. 3 is a schematic view of the processing device 30, the several instruction levels 31 to 33 and a microcontroller 34. The microcontroller 34 is in the form of a semiconductor chip, including functional areas not shown in detail, such as an arithmetic unit and a memory device, which may be addressed with the aid of commands from the first instruction level 31. The first instruction level 31 may be either preset permanently on the microcontroller 34 or be interchangeable; it is described as firmware. In a second instruction level 32, also described as the operating system, administration of signals of the internal bus system and the external bus system takes place, which are here converted according to the provided direction of transmission for the signals between the external bus system and the internal bus system or vice-versa. The second instruction level 32 is also designed to pass on signals to the first instruction level 31 for example for the storage of signals in the memory device and/or for the readout of stored data from the memory device. In addition, the second instruction level 32 is also set up for data interchange with the third instruction level 33, which by way of example is in the form of a virtual machine in the sense of a runtime environment. The third instruction level 33 provides a protected environment for an instruction module 35, which may be loaded into the third instruction level 33 via an interface, not shown in detail, and is designed for processing of signals, in particular raw data from the second instruction level. Data interchange between the instruction module 35 and the first or second instruction levels 31, 32 is always possible only through the agency of the third instruction level, in order to avoid undesired or unpermitted access of the instruction module 35—for example to the microcontroller 34.

With the aid of the instruction module 35, for example incoming signals from a sensor 16 to the bus node 11 may be counted and, on reaching a presettable number of meter pulses, an output signal may be output over the second instruction level to the external and/or internal bus system.

In addition or alternatively, the instruction module 35 may be provided for a logical linking of several signals, for example the signals of a sensor 16 and an actuator 17, in order to generate from this, in the presence of a presettable signal pattern, one or more output signals.

The output signal or signals may be supplied by the bus node 11 to the external bus system 21 for further processing in the machine control 22. In addition or alternatively, the output signal or signals from the bus node 22 via the internal bus system may be used at an input/output module 12 to drive a a sensor 16 connected to this input/output module 12 for example for sensor parameter setting, and/or an actuator 17, for example for actuator driving or control. In addition or alternatively, the output signal or signals may also be passed on to function modules 13, to trigger presettable actions at that point.

The invention claimed is:

1. A signal processing system with a bus node, which is designed for signal conversion between signals of an internal and an external bus system, and in each case comprising at least one interface for coupling to the external bus system and the internal bus system, and with at least one signal conditioning module which is designed for physical conditioning and/or analog-to-digital conversion of signals of an external component and has an interface for the internal bus system and at least one connection for the external component, and is connected to the bus node via the internal bus system, wherein the bus node is designed for internal raw data processing of signals provided by the signal conditioning module, and for output of at least one output signal, dependent on the processed signals, to the internal and/or the external bus system, and wherein the bus node includes an at least partly freely programmable and/or freely allocable memory device for the storage of an algorithm, and a processing device for processing the signals provided by the signal conditioning module and for the output of an output signal by means of the stored algorithm, and wherein the processing device contains several instruction levels for the processing of different instructions, wherein a first instruction level is set up for direct communication with the processing device, and further instruction levels for exclusive communication with in each case adjacent instruction levels, and wherein the processing device is set up in one instruction level, located above the first instruction level, for the operation of one or more instruction modules presettable by the end user, and wherein the algorithm provided for processing the signals supplied from the signal conditioning module and to output an output signal is in the form of an instruction module, and wherein the instruction module is designed for monitoring energy flows and/or volume flows and/or servicing intervals and/or safety functions of the external components connected thereto.

2. A signal processing system according to claim 1, wherein the processing device is set up, in an instruction level which is located above the first instruction level, for data interchange with at least one instruction module by means of a standardised instruction command set.

3. A signal processing system with a bus node, which is designed for signal conversion between signals of an internal and an external bus system, and in each case comprising at least one interface for coupling to the external bus system and the internal bus system, and with at least one signal conditioning module which is designed for physical conditioning and/or analog-to-digital conversion of signals of an external component and has an interface for the internal bus system and at least one connection for the external component, and is connected to the bus node via the internal bus system, wherein the bus node is designed for internal raw data processing of signals provided by the signal conditioning module, and for output of at least one output signal, dependent on the processed signals, to the internal and/or the external bus system, and wherein the bus node includes an at least partly freely programmable and/or freely allocable memory device for the storage of an algorithm, and a processing device for processing the signals provided by the signal conditioning module and for the output of an output signal by means of the stored algorithm, and wherein the processing device contains several instruction levels for the processing of different instructions, wherein a first instruction level is set up for direct communication with the processing device, and further instruction levels for exclusive communication with in each case adjacent instruction levels, and wherein the processing device is set up, in an instruction level which is located above the first instruction level, for data interchange with at least one instruction module by means of a standardised instruction command set, and wherein the processing device includes in one instruction level, which is located above the first instruction level, a virtual machine, which is designed to operate the instruction module in a standardized instruction module environment.

4. A signal processing system with a bus node, which is designed for signal conversion between signals of an internal and an external bus system, and in each case comprising at least one interface for coupling to the external bus system and the internal bus system, and with at least one signal conditioning module which is designed for physical conditioning and/or analog-to-digital conversion of signals of an external component and has an interface for the internal bus system and at least one connection for the external component, and is connected to the bus node via the internal bus system, wherein the bus node is designed for internal raw data processing of signals provided by the signal conditioning module, and for output of at least one output signal, dependent on the processed signals, to the internal and/or the external bus system, and
  wherein the bus node includes an at least partly freely programmable and/or freely allocable memory device for the storage of an algorithm, and a processing device for processing the signals provided by the signal conditioning module and for the output of an output signal by means of the stored algorithm, and
  wherein the processing device contains several instruction levels for the processing of different instructions, wherein a first instruction level is set up for direct communication with the processing device, and further instruction levels for exclusive communication with in each case adjacent instruction levels, and
  wherein the processing device is set up, in an instruction level which is located above the first instruction level, for data interchange with at least one instruction module by means of a standardised instruction command set, and
  wherein a virtual machine is set up for simultaneous administration of several instruction modules and/or wherein several virtual machines are provided for the processing of different instruction modules.

5. A signal processing system according to claim 3, wherein the memory device is designed for write access or read-write access on the instruction module or modules by means of the external bus system and/or an input interface formed on the bus node, in order to facilitate modification and/or parameter setting and/or replacement of the instruction module.

6. A signal processing system according to claim 3, wherein the one more instruction modules is presettable by the end user, and wherein the algorithm provided for processing the signals supplied from the signal conditioning module and to output an output signal is in the form of an instruction module.

7. A signal processing system according to claim 3, wherein the signal conditioning module is designed exclusively for physical conditioning and/or analog-to-digital conversion of signals of one external component.

8. A signal processing system according to claim 3, wherein the bus node is designed for the provision of an output signal which is set up for the driving of at least one external component and/or function module connected to a signal conditioning module.

9. A method for processing signals in a signal processing system which is designed for detection of signals of an external component, passing on of the signals via an internal bus system to a bus node and processing of the signals in the bus node, the method comprising:
  receiving of signals from an external component;
  conditioning and or digitalisation of the signals;
  transmission of the signals via the internal bus system to the bus node;
  processing of the signals arriving as raw data in the bus node by means of an algorithm filed in the bus node; and
  outputting of an output signal generated through the processing to an external component and/or a function module,
  wherein the signals arriving at the bus node as raw data are processed in a processing device included in the bus node and in which several instruction levels are designed for the processing of several instructions, wherein a first instruction level is set up for direct communication with the processing device and further instruction levels are set up for communication with respectively adjacent instruction levels, and wherein the algorithm is provided in an instruction module in a further instruction level located above the first instruction level, the further instruction level including a virtual machine designed to operate the instruction module in a standardized instruction module environment.

10. A method according to claim 9, wherein write access or read-write access to the memory device is made by means of the external bus system and/or an input interface formed at the bus node, in order to accomplish a change and/or parameter setting and/or replacement of the instruction module.

11. A method according to claim 9, wherein the signal conditioning module carries out exclusively physical conditioning and/or analog-to-digital conversion of signals of an external component.

* * * * *